United States Patent
Cho et al.

(10) Patent No.: US 9,432,915 B2
(45) Date of Patent: Aug. 30, 2016

(54) METHOD FOR PERFORMING EFFICIENT RANGING IN A BROADBAND WIRELESS ACCESS SYSTEM

(75) Inventors: Hee Jeong Cho, Anyang-si (KR); Young Soo Yuk, Anyang-si (KR); Yong Ho Kim, Anyang-si (KR); Ki Seon Ryu, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 1070 days.

(21) Appl. No.: 13/575,460

(22) PCT Filed: Jan. 27, 2011

(86) PCT No.: PCT/KR2011/000578
§ 371 (c)(1),
(2), (4) Date: Jul. 26, 2012

(87) PCT Pub. No.: WO2011/093657
PCT Pub. Date: Aug. 4, 2011

(65) Prior Publication Data
US 2012/0287812 A1 Nov. 15, 2012

Related U.S. Application Data

(60) Provisional application No. 61/298,911, filed on Jan. 27, 2010, provisional application No. 61/300,035, filed on Feb. 1, 2010, provisional application No. 61/303,686, filed on Feb. 12, 2010.

(30) Foreign Application Priority Data

Jan. 26, 2011 (KR) .................. 10-2011-0007716

(51) Int. Cl.
*H04L 12/28* (2006.01)
*H04W 48/16* (2009.01)
(Continued)

(52) U.S. Cl.
CPC ............ *H04W 48/16* (2013.01); *H04W 36/00* (2013.01); *H04W 64/00* (2013.01); *H04W 74/0833* (2013.01)

(58) Field of Classification Search
CPC .......................... H04W 24/00; H04W 72/04
USPC ........................ 370/252, 278, 329
See application file for complete search history.

(56) References Cited

U.S. PATENT DOCUMENTS 8,346,283 B2 * 1/2013 Cha et al. .................. 455/456.2
2009/0298504 A1 * 12/2009 Lee .................. H04W 36/0011
455/437

(Continued)

OTHER PUBLICATIONS

Chen et al., "Design Considerations for UL Ranging Channels in 802.16m," IEEE 802.16 Working Group, IEEE S80216m-08/321, IEEE Session #55, Macau, May 8, 2008, pp. 1-14.

(Continued)

*Primary Examiner* — John Pezzlo
(74) *Attorney, Agent, or Firm* — Birch, Stewart, Kolasch & Birch, LLP

(57) ABSTRACT

The present invention relates to a broadband wireless access system; and more specifically to a method and apparatus for performing an efficient ranging procedure by mobile station and a base station, by distinguishing the dedicated ranging from the contention-based random access. A method for performing ranging with a mobile station in a broadband wireless access system according to one embodiment of the present invention comprises: transmitting a first ranging code for requesting ranging to a base station through a first ranging opportunity of a first frame; and receiving a first message including a response to the first ranging code, wherein if the first ranging code is a dedicated ranging code and the response to the first ranging code is "continue", the first message may further include at least one of a dedicated flag field, a second ranging code, and the information on the second ranging opportunity.

11 Claims, 11 Drawing Sheets

(51) Int. Cl.
  *H04J 1/16* (2006.01)
  *H04W 36/00* (2009.01)
  *H04W 64/00* (2009.01)
  *H04W 74/08* (2009.01)

(56) References Cited

U.S. PATENT DOCUMENTS

| | | | | |
|---|---|---|---|---|
| 2009/0307663 | A1* | 12/2009 | Maybee | G06F 11/3632 717/124 |
| 2010/0002665 | A1* | 1/2010 | Oguchi | H04W 52/0216 370/338 |
| 2011/0080893 | A1* | 4/2011 | Fong | H04W 36/0055 370/331 |
| 2011/0090856 | A1* | 4/2011 | Cho | H04L 5/1469 370/329 |

OTHER PUBLICATIONS

Cho et al., "Proposed changes to the CDMA-based Raging Procedure (D2—15.2.15.3.1)," IEEE 802.16 Broadband Wireless Access Working Group <http://ieee802.org/16>, IEEE C802.16m-09/2284, Nov. 6, 2009, pp. 1-8.

Chou et al., "Text Proposal on the AAI_RNG-ACK Message for Unicast (16.2.3.3)," IEEE 802.16 Broadband Wireless Access Working Group <http://ieee802.org/16>, IEEE C802.16m-09/2909r4, Jan. 10, 2009, pp. 1-3.

Jung et al., "Dedicated Ranging Code Usage (Section 16.2.6.3.3)," IEEE 802.16 Working Group, IEEE 802.16 Presentation Submission Template (Rev. 9), IEEE C802.16m-09/2935, Dec. 30, 2009, pp. 1-4.

* cited by examiner

METHOD FOR PERFORMING EFFICIENT RANGING IN A BROADBAND WIRELESS ACCESS SYSTEM

CROSS REFERENCE TO RELATED APPLICATIONS

This application is the National Phase of PCT/KR2011/000578 filed on Jan. 27, 2011, which claims priority under 35 U.S.C. 119(e) to U.S. Provisional Application No. 61/298,911 filed Jan. 27, 2010, U.S. Provisional Application No. 61/300,035 filed Feb. 1, 2010 and U.S. Provisional Application No. 61/303,686 filed Feb. 12, 2010 and under 35 U.S.C. 119(a) to Patent Application No. 10_2011-0007716 filed in Republic of Korea on Jan. 26, 2011, all of which are hereby expressly incorporated by reference into the present application.

TECHNICAL FIELD

The present invention relates to a broadband wireless access system, and more specifically, to a method and apparatus for performing an efficient ranging procedure by a mobile station and a base station, by distinguishing dedicated ranging from contention-based random access ranging.

BACKGROUND ART

Major standards established by IEEE 802.16 working group include IEEE 802.16-2004 called fixed WiMAX and IEEE 802.16e-2005 (referred to as 16e hereinafter) called mobile WiMAX. IFFF 802.16e-2005 was finally approved as a standard by the IEEE in December 2005. Standards that are the basis of mobile WiMAX of the present version are IEEE 802.16-2004, IEEE 802.16e-2005 (this document includes corrigenda of IEEE 802.16-2004), and IEEE 802.16-2004/corrigenda2/D8. Standardization of IEEE 802.16m (referred to as 16m hereinafter) for mobile WiMAX of the next version is in progress in TGm under the IEEE 802.16 working group.

A process through which a mobile station adjusts transmission parameters (a frequency offset, a time offset, and transmit power) for uplink communication with a base station during an initial network registration procedure is referred to as initial ranging. After a network registration procedure, the mobile station performs periodic ranging in order to continue uplink communication with the base station. Ranging procedures include handover ranging for simplifying a handover procedure of a mobile station and bandwidth-request ranging performed during a procedure through which a mobile station requests an uplink band upon generation of data to be transmitted.

In a broadband wireless access system, a CDMA code (or ranging preamble) set that can be used for ranging according to ranging type and a region in which a CDMA code is transmitted are allocated through a channel (e.g. UL-MAP) through which system information is broadcast by a network. Accordingly, if a specific mobile station performs handover ranging, the mobile station needs to request handover ranging by selecting a specific code from CDMA codes for handover ranging and transmitting the selected code through initial ranging and handover ranging regions to the network. According to this scheme, the network can distinguish the ranging type through the received CDMA code and the region in which the CDMA code is transmitted.

More specifically, an IEEE 802.16m advanced mobile station (AMS) acquires downlink synchronization with a base station that is a target of ranging and receives uplink transmission parameters in order to perform initial ranging. The AMS selects a ranging slot (or ranging opportunity) according to random backoff, randomly selects an initial ranging code and transmits the initial ranging code in the selected ranging slot. Upon reception of the ranging code, the base station transmits a ranging acknowledgment (AAI_RNG-ACK) message to the AMS. The AAI_RNG-ACK message may include the ranging code transmitted by the AMS in a predetermined frame, code reception status and a physical correction value according to reception status.

Specifically, upon reception of ranging codes from AMSs, the base station transmits allocation information of the AAI_RNG-ACK message as a response to the ranging codes to the AMSs through a broadcast assignment A-MAP information element (IE) using a broadcast masking code. When the AAI_RNG-ACK message is transmitted to a specific AMS as an unsolicited signal, the allocation information is transmitted to the AMS through a downlink basic assignment A-MAP IE using a unicast station identifier (STID). In a specific case, for example, if all the ranging codes are successfully received, transmission of the AAI_RNG-ACK message may be omitted.

If there is no ranging code successfully decoded in the ranging slot selected by the AMS or there is no response to an initial ranging attempt, which corresponds to the AAI_RNG-ACK message, when the AMS receives the AAI_RNG-ACK message and checks a ranging acknowledgement bitmap (RNG-ACK bitmap) of the AAI_RNG-ACK message, the AMS can determine that the initial ranging attempt has failed. Accordingly, the AMS restarts the initial ranging procedure.

When initial ranging is successfully performed, the base station may provide the following three types of responses to the AMS through the AAI_RNG-ACK message. First, when a ranging status is "continue", a physical correction value is included in the corresponding message. Second, when the ranging status is "success", the base station allocates an uplink resource for ranging request message transmission to the AMS. Here, the physical correction value may be included. Finally, when the ranging status is "abort", the base station may request the AMS to interrupt the ranging procedure for a predetermined time.

The AMS continues the ranging procedure using the physical correction value included in the AAI_RNG-ACK message when the ranging status is "continue". When the ranging status is "success", the AMS is allocated the uplink resource by the base station and transmits an AAI_RNG-REQ message to the base station through the uplink resource.

The AAI_RNG-ACK message is a response to handover/periodic ranging as well as initial ranging, and the base station transmits the AAI_RNG-ACK message within a predefined time (i.e. a duration: transmission offset).

Upon reception of "continue" status and physical correction information through the AAI_RNG-ACK message, the AMS adjusts timing, power, frequency, etc. according to correction information, in general. Then, the AMS transmits a CDMA ranging code randomly selected from an initial ranging sequence domain to the base station. In this procedure, if another AMS transmits the same code as that transmitted by the AMS at the same time, the base station recognizes collision and does not perform the next process (e.g. a process of transmitting "continue" status or allocating an uplink resource for AAI_RNG-REQ message transmission).

In this case, the corresponding AMS may re-perform the initial ranging code transmission procedure or move to a different base station. This is because an operation for re-checking some parameters (i.e. correcting physical parameters according to "continue" status) is performed in a contention-based environment. This is generated in handover ranging or periodic ranging as well as in the initial ranging.

Accordingly, it is necessary to seek for a method for avoiding collision due to re-attempt in a post-ranging procedure of the AMS that receives "continue" status.

Furthermore, when the AMS re-transmits a ranging code upon receiving "continue" status, the AMS waits for a time corresponding to a value determined by a backoff algorithm and then re-transmits the ranging code. Even when the ranging code transmitted by the AMS is a dedicated ranging code, a wait time according to the backoff algorithm is not changed. Because the backoff algorithm is used as a method for minimizing code collision, application of the backoff algorithm to an AMS using a dedicated ranging code causes unnecessary delay.

DISCLOSURE

Technical Problem

An object of the present invention is to provide an efficient ranging procedure.

Another object of the present invention is to provide a method for preventing collision that may occur in a code retransmission procedure when a ranging code transmission status is "continue".

Another object of the present invention is to provide a ranging procedure capable of preventing generation of unnecessary delay in a dedicated ranging procedure.

The technical problems solved by the present invention are not limited to the above technical problems and those skilled in the art may understand other technical problems from the following description.

Technical Solution

According to an aspect of the present invention, a method of performing ranging with mobile station (MS) in a broadband wireless access system includes: transmitting a first ranging code for requesting ranging to a base station through a first ranging opportunity of a first frame; and receiving a first message including a response to the first ranging code, wherein if the first ranging code is a dedicated ranging code and the response to the first ranging code is "continue", the first message may further include at least one of a dedicated flag field, a second ranging code, and information on a second ranging opportunity.

The method may further include retransmitting the first ranging code in a first ranging opportunity of a frame after frames corresponding to a predetermined frame offset from the time when the first message is received if the dedicated flag field is set to '1' in the first message.

The first message may include the second ranging code and the information on the second ranging opportunity if the dedicated flag field included in the first message is set to '1', and the method may further include transmitting the second ranging code in a ranging opportunity indicated by a second ranging opportunity of a frame after frames corresponding to a predetermined frame offset from the time when the first message is received.

the first message may include the information on the second ranging opportunity if the dedicated flag field is set to '1' and included in the first message, and the method may further include retransmitting the first ranging code in a ranging opportunity indicated by a second ranging opportunity of a frame after frames corresponding to a predetermined frame offset from the time when the first message is received.

The first message may be a ranging acknowledgement (AAI_RNG-ACK) message and the response to the first ranging code may be a ranging status field.

According to another aspect of the present invention, a method of performing ranging with a base station in a broadband wireless access system includes: receiving a first ranging code for requesting ranging from a mobile station through a first ranging opportunity of a first frame; if the first ranging code is a dedicated ranging code previously allocated to the mobile station along with an identifier for the mobile station, transmitting a first message including a response to the first ranging code to the mobile station in a unicast manner based on the identifier; and transmitting, to the mobile station, uplink resource allocation information about an uplink resource through which the mobile station will transmit a second message through a first A-MAP IE, upon successful reception of the first ranging code.

The method may further include: receiving the second message from the mobile station; transmitting, to the mobile station, downlink resource information for transmitting a third message to the mobile station as a response to the second message through a second A-MAP IE; and transmitting the third message to the mobile station through a downlink resource indicated by the downlink resource information.

The first message may be an AAI_RNG-ACK message, the identifier for the mobile station may be a station identifier (STID), the second message may be a ranging request (AAI_RNG-REQ) message, and the first A-MAP IE may be an uplink basic assignment A-MAP IE.

The third message may be a ranging response (AAI_RNG-RSP) message and the second A-MAP IE may be a unicast downlink basic assignment A-MAP IE using the STID.

The third message may be a ranging response (AAI_RNG-RSP) message and the second A-MAP may be a random access identifier (RAID) based CDMA allocation A-MAP IE.

According to another aspect of the present invention, a mobile station performing ranging in a broadband wireless access system includes: a processor; and a radio frequency (RF) module configured to transmit/receive RF signals under the control of the processor, wherein the processor is configured to transmit a first ranging code for requesting ranging to a base station through a first ranging opportunity of a first frame and to receive a first message including a response to the first ranging code, wherein if the first ranging code is a dedicated ranging code and the response to the first ranging code is "continue", the first message may further include at least one of a dedicated flag field, a second ranging code, and information on a second ranging opportunity.

The processor may retransmit the first ranging code in a first ranging opportunity of a frame after frames corresponding to a predetermined frame offset from the time when the first message is received if the dedicated flag field is set to '1' in the first message.

The first message may include the second ranging code and the information on the second ranging opportunity if the dedicated flag field is '1' and included in the first message, wherein the processor transmits the second ranging code in a ranging opportunity indicated by a second ranging opportunity of a frame after frames corresponding to a predetermined frame offset from the time when the first message is received.

The first message may include the information on the second ranging opportunity if the dedicated flag field included in the first message is set to '1', wherein the processor retransmits the first ranging code in a ranging opportunity indicated by a second ranging opportunity of a frame after frames corresponding to a predetermined frame offset from the time when the first message is received.

The first message may be an AAI_RNG-ACK message and the response to the first ranging code may be a ranging status field.

Advantageous Effects

According to the embodiments of the present invention, a ranging procedure can be efficiently performed.

Particularly, when the ranging status of a ranging code transmitted from a mobile station to a base station is "continue", it is possible to prevent collision between the ranging code retransmitted from the mobile station and a ranging code transmitted from another mobile station.

Furthermore, unnecessary delay can be prevented in a ranging procedure using a dedicated ranging code.

The effects of the present invention are not limited to the above-described effects and other effects which are not described herein will become apparent to those skilled in the art from the following description.

BEST MODE

Figure 1:
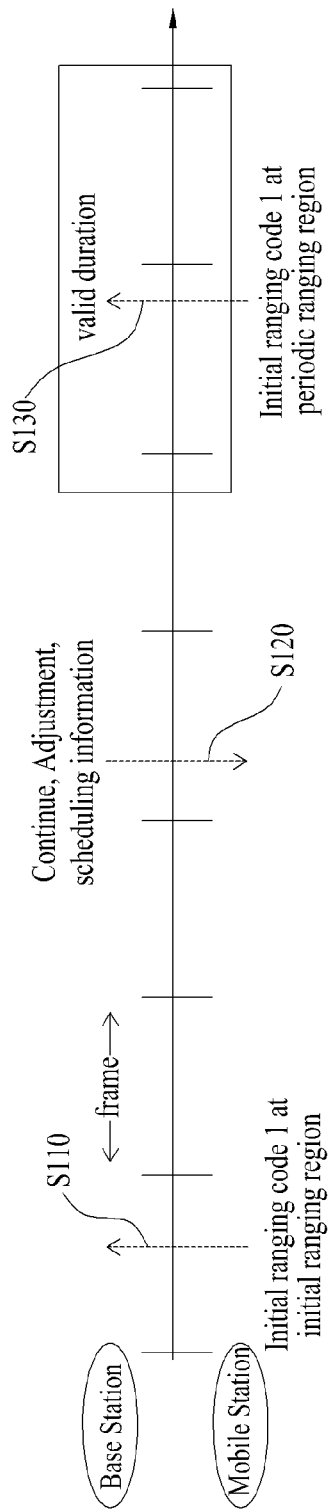
FIG. 1 illustrates an exemplary ranging procedure according to a first embodiment of the present invention.

The present invention relates to a wireless access system. The following embodiments of the present invention describe efficient ranging procedures and an apparatus for performing the same.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given centering on a data transmission and reception relationship between a base station and a mobile station (MS). The base station is a terminal node of a network, which communicates directly with a mobile station. In some cases, a specific operation described as performed by the base station may be performed by an upper node of the BS.

Namely, it is apparent that, in a network comprised of a plurality of network nodes including a base station, various operations performed for communication with a mobile station may be performed by the base station, or network nodes other than the base station. The term 'base station (BS)' may be replaced with the term 'fixed station', 'Node B', 'evolved Node B (eNode B or eNB)', 'Access Point (AP)', 'advanced BS (ABS)', etc. The term 'terminal' may be replaced with the term 'user equipment (UE)', 'Mobile Station (MS)', 'Mobile Subscriber Station (MSS)', 'advanced MS (AMS)', 'Subscriber Station (SS)', etc.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), and 3GPP2. Steps or parts that are not described to clarify the technical features of the present invention can be supported by those documents. Further, all terms as set forth herein can be explained by the standard documents. Particularly, the embodiments of the present invention can be supported by at least one of standard documents of IEEE 802.16, P802.16-2004, P802.16e-2005, P802.16Rev2 and IEEE P802.16m.

Specific terms used for the embodiments of the present invention are provided to help the understanding of the present invention. These specific terms may be replaced with other terms within the scope and spirit of the present invention.

Ranging codes may be divided into code sets for contention-based MSs and code sets for non-contention-based MSs. The contention-based MSs need to inform a base station of the purpose of ranging. Accordingly, the code sets for the contention-based MSs can be divided into a code set for initial ranging, a code set for handover ranging and a code set for periodic ranging.

The base station allocates ranging codes and transmission positions that will be used by non-contention-based MSs to the non-contention based MSs through an AAI_HO-CMD message. Accordingly, when a mobile station transmits a ranging code through a transmission position allocated thereto by the base station, the base station already knows the mobile station, the ranging code and the purpose of the ranging code, and thus the code sets for the non-contention-based MSs need not be divided.

For example, if ranging code #1 is allocated to MS A that will perform handover, the base station that receives ranging code #1 knows that MS A transmits ranging code #1 for the purpose of handover. However, when the reception status of the ranging code is "continue", the mobile station (MS) should perform contention-based ranging code transmission again.

First Embodiment

In accordance with a first embodiment of the present invention, when a transmission result of a dedicated ranging code previously allocated to a mobile station is "continue", the base station includes a code and ranging channel information for code retransmission of the mobile station in an AAI_RNG-ACK message.

Here, a ranging channel corresponding to the ranging channel information included in the AAI_RNG-ACK message may be a ranging channel dynamically allocated by the base station for only this purpose.

More specifically, the AAI_RNG-ACK message according to this embodiment includes ranging status information indicating "continue" status, a physical parameter correction value, and the following information.

Dedicated ranging code
Ranging channel: indicated by at least one of a superframe, a frame, a subframe, and an opportunity.
Valid duration of the dedicated ranging code:
This can be based on the position of the ranging channel.

In the AAI_RNG-ACK message including the above information, the dedicated ranging code may be divided 1) according to ranging type (purpose) or 2) according to a contention/non-contention scheme irrespective of ranging type (purpose).

1) When ranging channels are not divided according to contention/non-contention scheme and a dedicated ranging code is selected according to ranging purpose, it is not desirable to determine ranging code sets irrespective of contention/non-contention. In this case, preferably, the ranging code sets are determined such that a code set for a mobile station performing contention-based ranging is distinguished from a code set for a mobile station performing ranging using a dedicated ranging code. Information about the distinguished code sets may be signaled by the base station to the mobile stations through an S-SFH or may be predefined by a system parameter.

2) When dedicated ranging codes are divided according to contention/non-contention scheme irrespective of ranging purpose, a dedicated ranging code set may be predefined. This dedicated ranging code set may be signaled by the base station to mobile stations through an S-SFH or may be predefined by a system parameter.

The AAI_RNG-ACK message is used in IEEE 802.16m systems and may be replaced by an RNG-RSP message in IEEE 802.16e systems.

In accordance with an aspect of this embodiment of the present invention, when a reception status of an initially transmitted ranging code is "continue", the same ranging code as the initially transmitted ranging code is transmitted on a ranging channel for ranging for a different purpose. A ranging method according to this aspect may be useful when a ranging code format corresponds to a ranging channel format irrespective of ranging type. This will now be described with reference to FIGS. 1 and 2.

FIG. 1 illustrates an exemplary ranging procedure according to an embodiment of the present invention.

Referring to FIG. 1, a mobile station transmits initial ranging code 1 on an initial ranging channel of a base station (S110).

When the reception status of initial ranging code 1 is "continue", the base station sets a ranging status to "continue" in an AAI_RNG-ACK message, includes a physical correction value and ranging channel scheduling information in the AAI_RNG-ACK message, and transmits the AAI_RNG-ACK message to the mobile station (S120). Here, the ranging channel scheduling information includes information about the position and valid duration of a ranging channel for ranging code retransmission.

Upon reception of the AAI_RNG-ACK message, the mobile station corrects physical parameters and transmits initial ranging code 1 on a periodic ranging channel at the time indicated by the scheduling information (S130).

The ranging channel scheduling information may not be included in the AAI_RNG-ACK message. A ranging procedure in this case is described with reference to FIG. 2.

Figure 2:
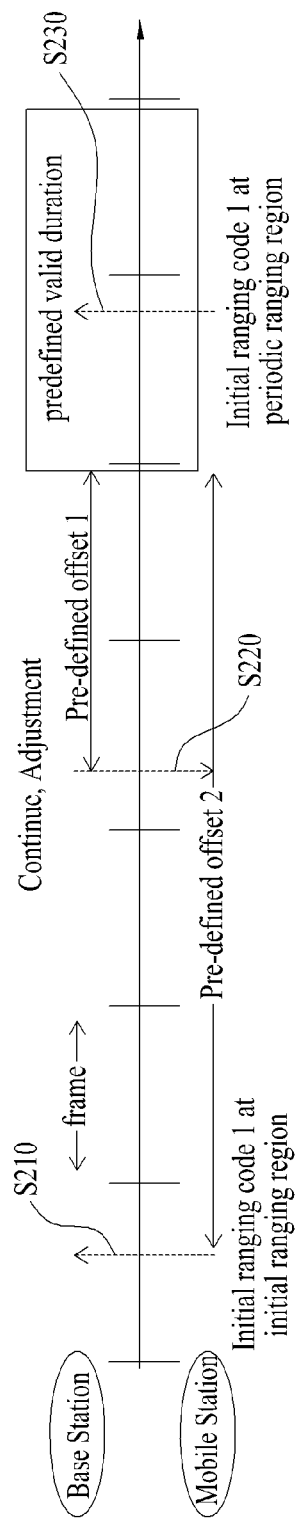
FIG. 2 illustrates another exemplary ranging procedure according to the first embodiment of the present invention.

FIG. 2 illustrates another exemplary ranging procedure according to the present embodiment of the invention.

In the ranging procedure shown in FIG. 2, it is assumed that the ranging channel scheduling information is not included in the AAI_RNG-ACK message, and a valid duration in which a code can be transmitted and the start point of the valid duration are predetermined. The start point of the valid duration may be calculated by a predetermined offset (offset 1) from the time when the AAI_RNG-ACK message is received or by a predetermined offset (offset 2) from the time when a ranging code is initially transmitted. Information on the offset and the valid duration may be transmitted to the mobile station through an S-SFH or may be predefined by system parameters.

Referring to FIG. 2, the mobile station transmits initial ranging code 1 on the initial ranging channel of the base station (S210).

When the reception status of initial ranging code 1 is "continue", the base station sets a ranging status to "continue" in the AAI_RNG-ACK message, includes a physical correction value in the AAI_RNG-ACK message, and transmits the AAI_RNG-ACK message to the mobile station (S220).

Upon reception of the AAI_RNG-ACK message, the mobile station corrects physical parameters and transmits initial ranging code 1 on the periodic ranging channel within the predefined valid duration (S230).

AAI_RNG-ACK message formats for implementing the present embodiment of the invention will now be described in detail with reference to Tables 1, 2 and 3.

TABLE 1

| Syntax | Size (bits) | Notes |
| --- | --- | --- |
| RNG-ACK_Message_Format ( ){ | — | — |
| Management Message Type=TBD | 8 | — |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; N_RNG_Slots; i++){ | | — |
| If(RNG-ACK bitmap[i]==1){ | | — |
| Number of Received codes (L) | TBD | The number of ranging code indices included in this ACK A-MAP IE. |
| For (j=0; j<L; j++){ | | — |
| Code index | TBD | Code index received in the ranging opportunity |
| Ranging status | 2 | Used to indicate whether UL messages are received within acceptable limits by BS. 0b01=continue, 0b11=abort, 0b00=success |
| If(Ranging status==0b01) { | | — |
| Dedicated ranging code index | TBD | A unique code assigned to the AMS, to be used for dedicated ranging. Code is from the dedicated ranging code set. |
| transmission region | TBD | A unique transmission region (e.g., frame offset, opportunity index) assigned to the MS, to be used for dedicated ranging. |
| Valid duration | TBD | Dedicated ranging code and transmission region are valid for this parameter. |
| API | 3 | Adjustment parameters indication Bit#0: "1" Timing Offset Adjustment is included; Bit#1: "1" Power Level Adjustment is included; Bit#2: "1" Frequency Offset Adjustment is included; |
| If(API bit#0==1){ Timing Offset Adjustment } | 10 | Tx timing offset adjustment |
| If (API bit#1==1){ Power Level Adjustment} | 3 | Tx Power offset adjustment |
| If (API bit#2==1){ Frequency Offset Adjustment}} } } } | 8 | Tx frequency offset adjustment |

Referring to Table 1, when a ranging status is "continue", a dedicated ranging code index, a transmission region and a valid duration may be included in the AAI_RNG-ACK message. The transmission region may indicate a ranging channel that is uniquely allocated such that a mobile station can transmit a dedicated ranging code assigned through the AAI_RNG-ACK message through the ranging channel.

TABLE 2

| Syntax | Size (bits) | Notes |
|---|---|---|
| RNG-ACK_Message_Format ( ){ | — | — |
| Management Message Type=TBD | 8 | — |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; N_RNG_Slots; i++){ | | — |
| If(RNG-ACK bitmap[i]==1){ | | — |
| Number of Received codes (L) | TBD | The number of ranging code indices included in this ACK A-MAP IE. |
| For (j=0; j<L; j++){ | | — |
| Code index | TBD | Code index received in the ranging opportunity |
| Ranging status | 2 | Used to indicate whether UL messages are received within acceptable limits by BS. 0b01=continue, 0b11=abort, 0b00=success |
| If(Ranging status==0b01) { | | — |
| API | 4 | Adjustment parameters indication Bit#0: "1" Timing Offset Adjustment is included; Bit#1: "1" Power Level Adjustment is included; Bit#2: "1" Frequency Offset Adjustment is included; Bit3#: "1" dedicated ranging code, transmission position and valid duration area included; |
| If(API bit#0==1){ Timing Offset Adjustment } | 10 | Tx timing offset adjustment |
| If (API bit#1== 1){ Power Level Adjustment} | 3 | Tx Power offset adjustment |
| If (API bit#2== 1){ Frequency Offset Adjustment} | 8 | Tx frequency offset adjustment |
| If (API bit#3==1) { dedicated ranging code index | TBD | A unique code assigned to the AMS, to be used for dedicated ranging. Code is from the dedicated ranging code set. |
| transmission region | TBD | A unique transmission region (e.g., frame offset, opportunity index) assigned to the MS, to be used for dedicated ranging. |
| valid duration }} } } } | TBD | Dedicated ranging code and Transmission region are valid for this parameter. |

Referring to Table 2, when the ranging status is "continue" and bit #3 of an adjustment parameter indication (API) field is 1, the dedicated ranging code index, transmission region and valid duration may be included in the AAI_RNG-ACK message. The information has the same contents as those shown in Table 1.

TABLE 3

| Syntax | Size (bits) | Notes |
|---|---|---|
| RNG-ACK_Message Format( ){ | — | — |
| Management Message Type=TBD | 8 | — |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; N_RNG_Slots ; i++){ | — | — |
| If(RNG-ACK bitmap[i]== 1){ | | |
| Number of Received codes (L) | TBD | The number of ranging code indices included in this ACK A-MAP IE. |
| For (j=0; j<L; j++){ | — | |
| Code index | TBD | Code index received in the ranging opportunity |
| Ranging status | 2 | Used to indicate whether UL messages are received within acceptable limits by BS. 0b01=continue, 0b11=abort, 0b00=success |
| If(Ranging status==0b01 ) { | — | |
| Dedicated_Code _Flag | 1 | Dedicated Code Flag '0' indicates that dedicated ranging code, transmission region and valid duration are not included. Dedicated_Code_Flag '1' indicates that dedicated ranging code, transmission region and valid duration are included. |
| If(Dedicated _Code_Flag ==1){ | | |
| dedicated ranging code index | TBD | A unique code assigned to the AMS, to be used for dedicated ranging. Code is from the dedicated ranging code set. |
| transmission region | TBD | A unique transmission region (e.g., frame offset, opportunity index) assigned to the MS, to be used for dedicated ranging. |
| valid duration | TBD | Dedicated ranging code and transmission region are valid for this parameter. |
| API | 3 | Adjustment parameters indication Bit#0: "1" Timing Offset Adjustment is included; Bit#1: "1" Power Level Adjustment is included; Bit#2: "1" Frequency Offset Adjustment is included; |
| If(API bit#0==1){ Timing Offset Adjustment } | 10 | Tx timing offset adjustment |
| If (API bit#1== 1){ Power Level Adjustment} | 3 | Tx Power offset adjustment |
| If (API bit#2== 1){ Frequency Offset Adjustment} }}}} | 8 | Tx frequency offset adjustment |

In Table 3, when the ranging status is "continue" and a dedicated code flag is 1, the dedicated ranging code index, transmission region and valid duration may be included in the AAI_RNG-ACK message. The information has the same contents as shown in Table 1.

When a dedicated ranging code is allocated to a mobile station through an AAI_HO-CMD message, the dedicated ranging code and ranging channel information (subframe, opportunity index) are valid until a ranging initiation deadline. Accordingly, in another aspect of the present embodiment, some of information transmitted through the AAI_RNG-ACK message may be omitted.

After transmitting the AAI_RNG-ACK message, the base station may dynamically allocate a ranging channel to an offset position of a predefined frame (e.g. a frame following the frame in which the AAI_RNG-ACK message is transmitted when a frame offset is 1) or to the frame in which the AAI_RNG-ACK message is transmitted if a ranging opportunity assigned through an SFH is not allocated to the offset position or the frame. Here, the ranging channel may be allocated to the same index (or subframe) as the opportunity index (or subframe) at which the corresponding dedicated ranging code is received. Furthermore, even when the ranging channel assigned through the SFH is allocated to the corresponding frame, the dedicated ranging channel may be dynamically allocated thereto separately from the ranging channel.

If the ranging initiation deadline expires and the base station determines that the dedicated ranging code or ranging channel allocated through the AAI_HO-CMD message cannot be used, a new code or ranging channel may be allocated through the AAI_RNG-ACK message. On the other hand, if the base station determines that the dedicated ranging code or ranging channel can be used although the ranging initiation deadline expires, the duration of the ranging code or ranging channel can be extended to the aforementioned frame offset through the AAI_RNG-ACK message.

AAI_RNG-ACK message formats for implementing another aspect of the present embodiment of the invention will now be described in detail with reference to Tables 4, 5 and 6.

TABLE 4

| Syntax | Size (bits) | Notes |
|---|---|---|
| RNG-ACK_Message_Format ( ){ | — | — |
| Management Message Type=TBD | 8 | — |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; N_RNG_Slots; i++){ | | — |
| If(RNG-ACK bitmap[i]==1){ | | — |
| Number of Received codes (L) | TBD | The number of ranging code indices included in this ACK A-MAP IE. |
| For (j=0; j<L; j++){ | | — |
| Code index | TBD | Code index received in the ranging opportunity |
| Ranging status | 2 | Used to indicate whether UL messages are received within acceptable limits by BS. 0b01 = continue, 0b11 = abort, 0b00 = success |
| If(Ranging status==0b01) { | | — |
| Dedicated_Flag | 1 | Dedicated_Flag '0' indicates that no dedicated ranging code and opportunity are provided. Dedicated_Flag '1' indicates that dedicated ranging code and opportunity are not changed. |
| API | 3 | Adjustment parameters indication Bit#0: "1" Timing Offset Adjustment is included; Bit#1: "1" Power Level Adjustment is included; Bit#2: "1" Frequency Offset Adjustment is included; |
| If(API bit#0==1){ Timing Offset Adjustment } | 10 | Tx timing offset adjustment |
| If (API bit#1==1){ Power Level Adjustment} | 3 | Tx Power offset adjustment |
| If (API bit#2==1){ Frequency Offset Adjustment}} } } } | 8 | Tx frequency offset adjustment |

Figure 4:
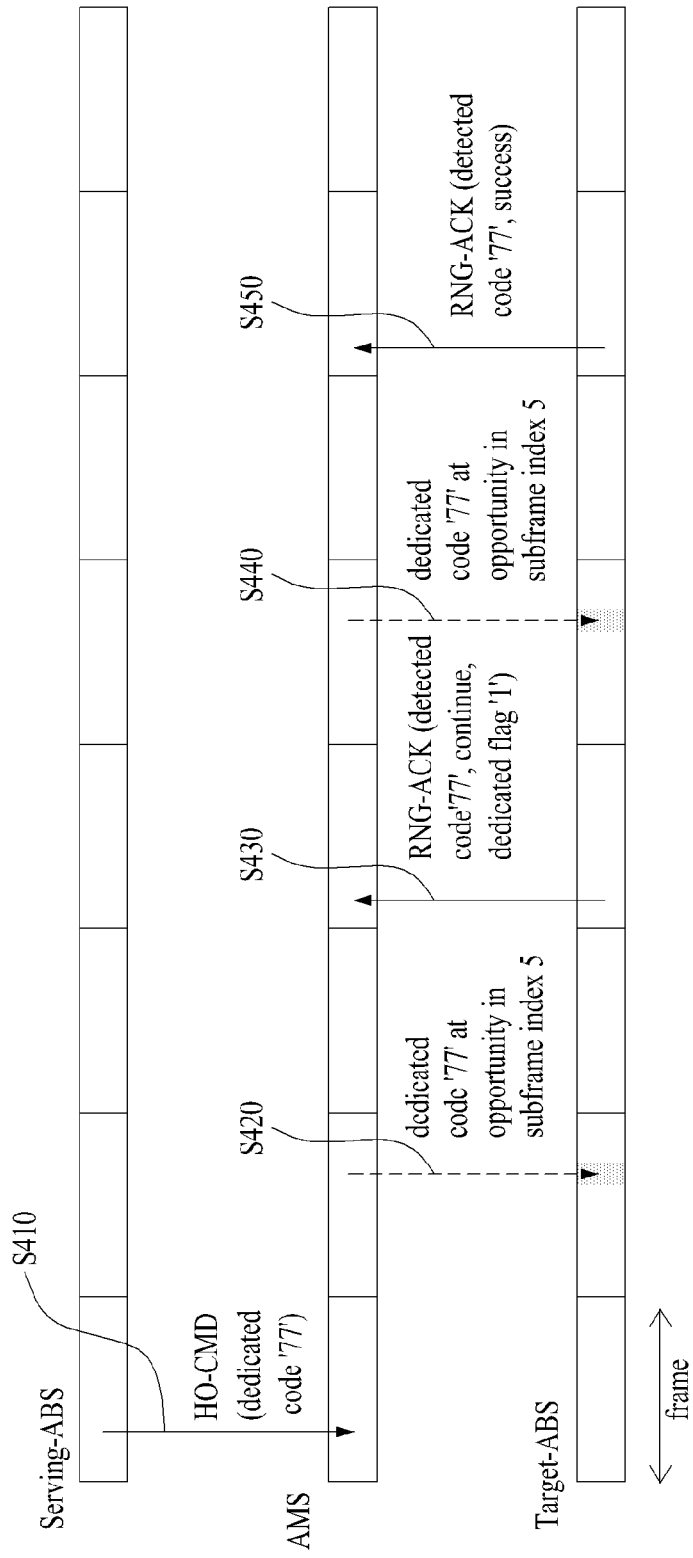
FIG. 4 illustrates another exemplary ranging procedure according to the first embodiment of the present invention.

Referring to FIG. 4, when a dedicated flag is included in the AAI_RNG-ACK message and set to '1', this may indicate that a dedicated code and a ranging channel (opportunity index) correspond to those of initial ranging. That is, when the dedicated flag is set to '1', this represents that a dedicated ranging code and ranging channel information allocated through the AAI_HO-CMD message are not changed.

TABLE 5

| Syntax | Size (bits) | Notes |
| --- | --- | --- |
| RNG-ACK_Message_Format ( ){ | — | — |
| Management Message Type=TBD | 8 | — |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; N_RNG_Slots; i++){ | | — |
| If(RNG-ACK bitmap[i]==1){ | | — |
| Number of Received codes (L) | TBD | The number of ranging code indices included in this ACK A-MAP IE. |
| For (j=0; j<L; j++){ | | — |
| Code index | TBD | Code index received in the ranging opportunity |
| Ranging status | 2 | Used to indicate whether UL messages are received within acceptable limits by BS. 0b01 = continue, 0b11 = abort, 0b00 = success |
| If(Ranging status==0b01) { | | — |
| Dedicated_Flag | 1 | Dedicated_Flag '0' indicates that no dedicated ranging code and opportunity are provided. Dedicated_Flag '1' indicates that dedicated ranging code and opportunity are provided. |
| If(Dedicated_Flag ==1){ | | |
| Opportunity index } | TBD | index of ranging opportunity assigned to the AMS, to be used for dedicated ranging. |
| API | 3 | Adjustment parameters indication Bit#0: "1" Timing Offset Adjustment is included; Bit#1: "1" Power Level Adjustment is included; Bit#2: "1" Frequency Offset Adjustment is included; |
| If(API bit#0==1){ Timing Offset Adjustment } | 10 | Tx timing offset adjustment |
| If (API bit#1==1){ Power Level Adjustment} | 3 | Tx Power offset adjustment |
| If (API bit#2==1){ Frequency Offset Adjustment}} } } } | 8 | Tx frequency offset adjustment |

Figure 5:
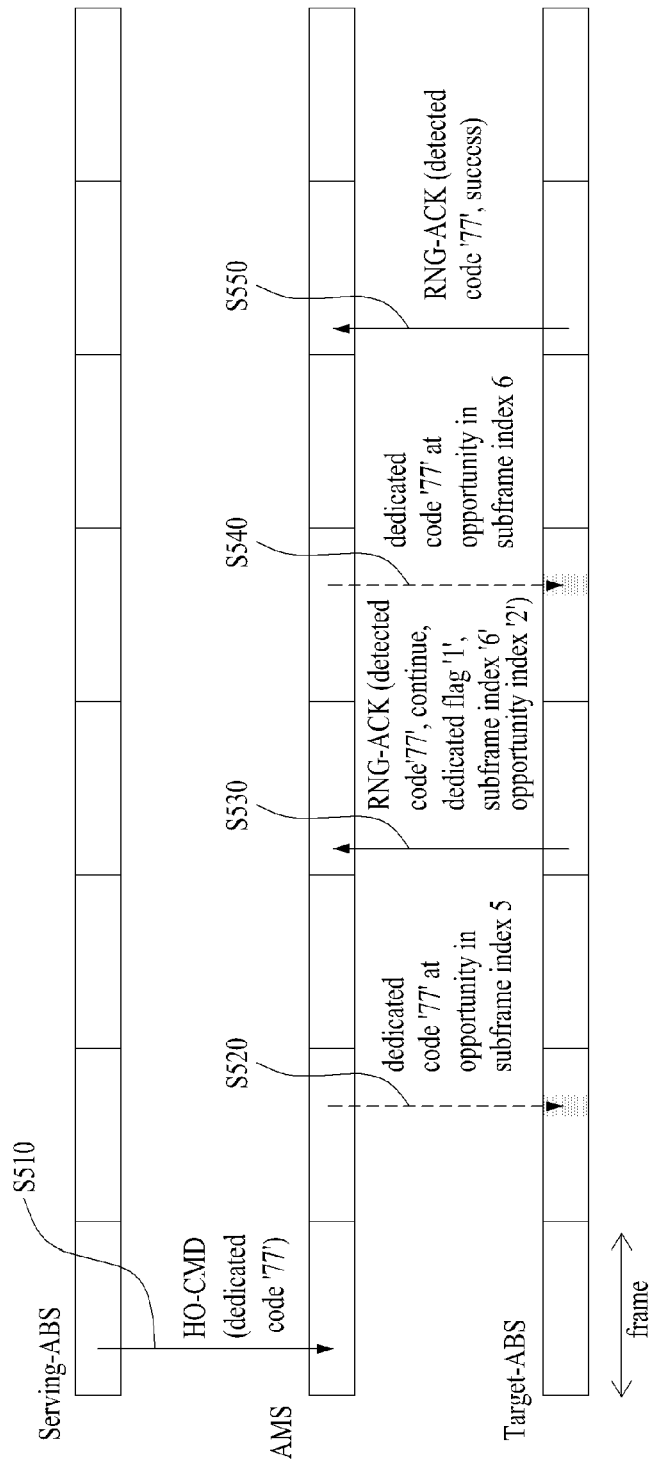
FIG. 5 illustrates another exemplary ranging procedure according to the first embodiment of the present invention.

Referring to FIG. 5, when the dedicated flag is included in the AAI_RNG-ACK message and set to '1', this indicates that the initial ranging code is not changed and a new ranging channel (opportunity index) is assigned.

Ranging procedures according to the present embodiment of the invention will now be described with reference to FIGS. 3 to 6.

Figure 3:
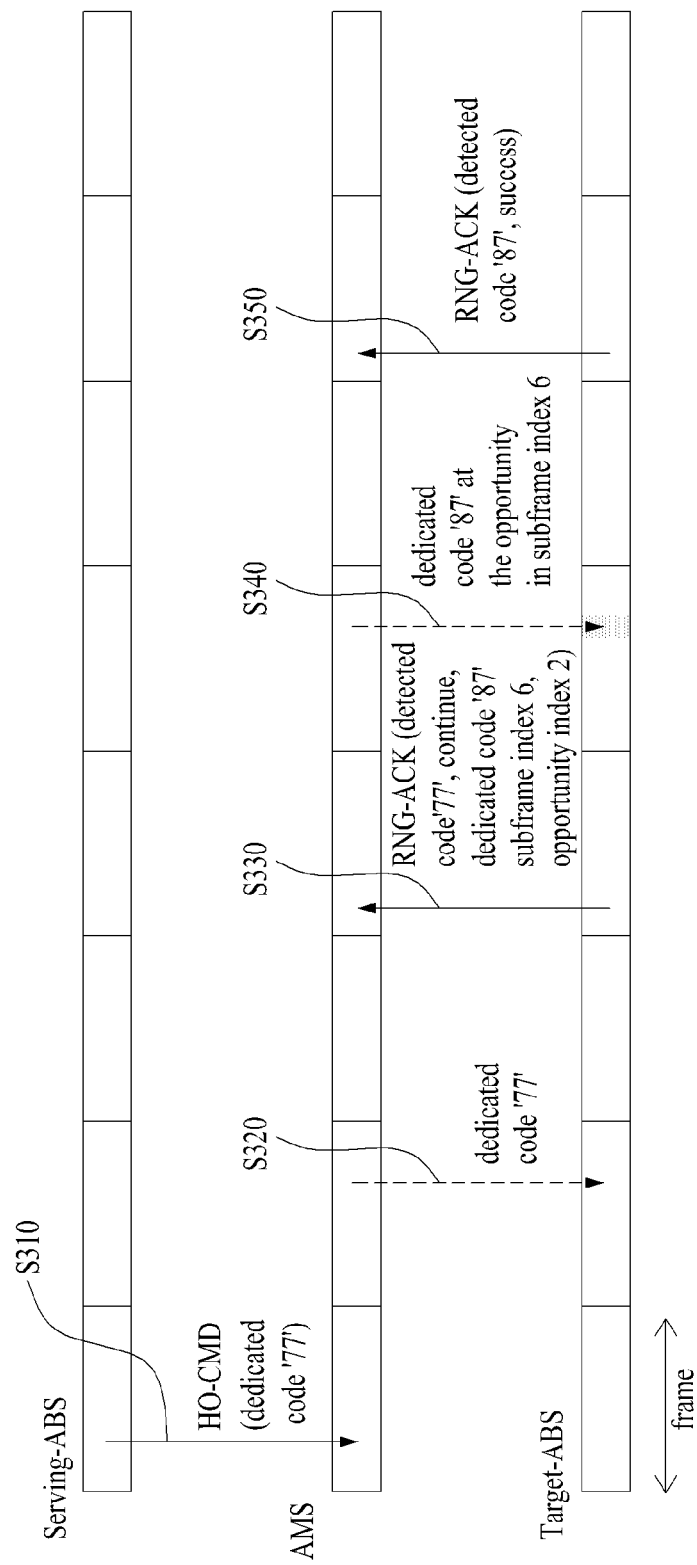
FIG. 3 illustrates another exemplary ranging procedure according to the first embodiment of the present invention.

FIG. 3 illustrates another exemplary ranging procedure according to the present embodiment of the invention.

TABLE 6

| Syntax | Size (bits) | Notes |
|---|---|---|
| RNG-ACK_Message_Format ( ){ | — | — |
| Management Message Type=TBD | 8 | — |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; N_RNG_Slots; i++){ If(RNG-ACK bitmap[i]==1){ | — | — |
| Number of Received codes (L) | TBD | The number of ranging code indices included in this ACK A-MAP IE. |
| For (j=0; j<L; j++){ | — | — |
| Code index | TBD | Code index received in the ranging opportunity |
| Ranging status | 2 | Used to indicate whether UL messages are received within acceptable limits by BS. 0b01 = continue, 0b11 = abort, 0b00 = success |
| If(Ranging status==0b01) { | — | — |
| Dedicated_Flag | 1 | Dedicated_Flag '0' indicates that no dedicated ranging code and opportunity are provided. Dedicated_Flag '1' indicates that dedicated ranging code and opportunity are provided. |
| If(Dedicated_Flag ==1){ Subframe index | 3 | index of subframe including ranging opportunity assigned to the AMS, to be used for dedicated ranging. |
| Opportunity index } | TBD | index of ranging opportunity assigned to the AMS, to be used for dedicated ranging. |
| API | 3 | Adjustment parameters indication Bit#0: "1" Timing Offset Adjustment is included; Bit#1: "1" Power Level Adjustment is included; Bit#2: "1" Frequency Offset Adjustment is included; |
| If(API bit#0==1){ Timing Offset Adjustment } | 10 | Tx timing offset adjustment |
| If (API bit#1==1){ Power Level Adjustment} | 3 | Tx Power offset adjustment |
| If (API bit#2==1){ Frequency Offset Adjustment}} } } } | 8 | Tx frequency offset adjustment |

Figure 6:
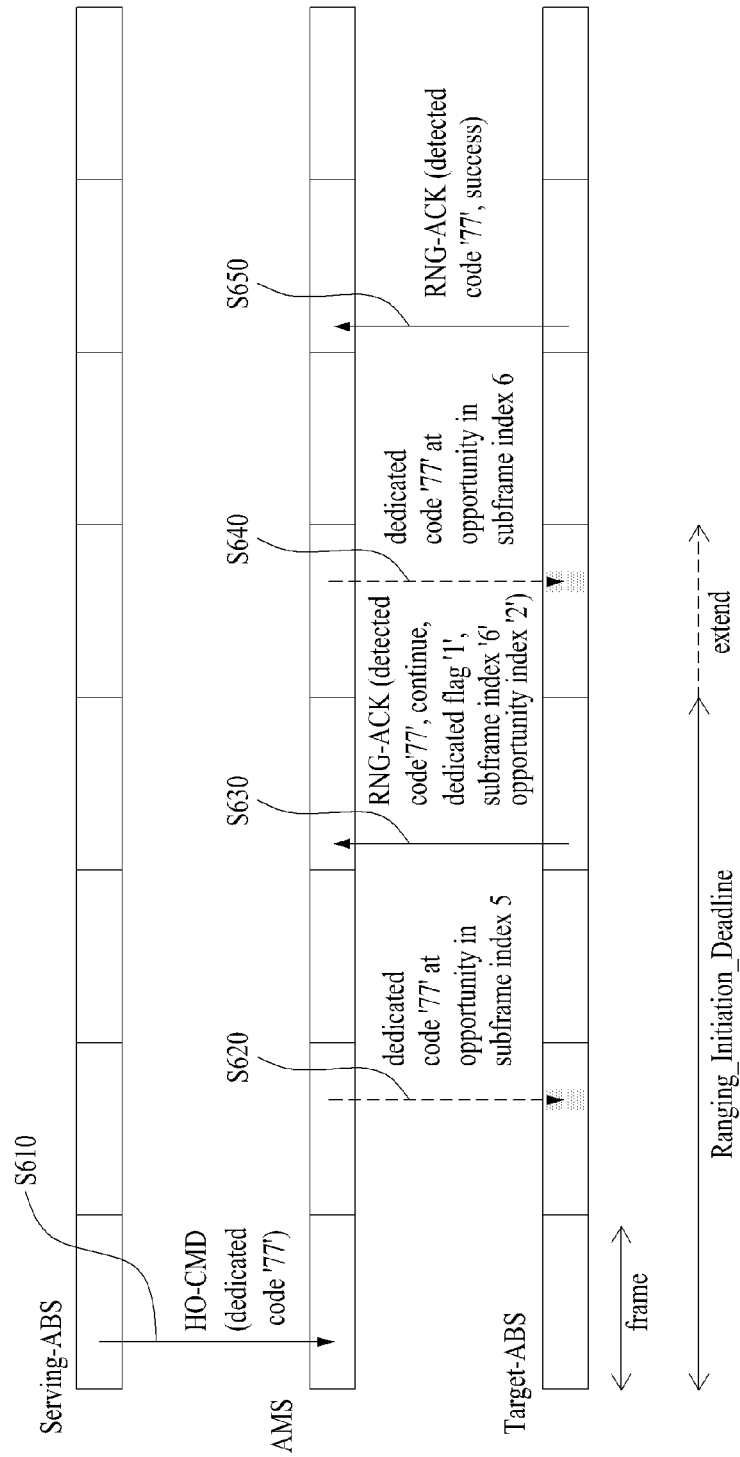
FIG. 6 illustrates another exemplary ranging procedure according to the first embodiment of the present invention.

Referring to FIG. 6, when the dedicated flag is included in the AAI_RNG-ACK message and set to '1', the AAI_RNG-ACK message may include the opportunity index of the ranging channel and information on a subframe corresponding to the opportunity index.

In FIG. 3, a ranging code and a ranging channel different from those transmitted by a mobile station are allocated such that the ranging code and ranging channel can be used for retransmission and it is assumed that the predetermined frame offset is 1.

Referring to FIG. 3, a serving base station transmits dedicated code '77' to the mobile station through an AAI_HO-CMD message (S310).

The mobile station transmits the dedicated code to a target base station (S320).

When the reception status of the dedicated code is "continue", the target base station sets a ranging status of the received dedicated code '77' to "continue" in an AAI_RNG-ACK message, includes a new dedicated ranging code '87', dedicated ranging channel (subframe index '6', opportunity index '2') information and a physical correction value in the AAI_RNG-ACK message, and transmits the AAI_RNG-ACK message to the mobile station (S330).

The mobile station corrects physical parameters and transmits, to the target base station, dedicated ranging code '87' with opportunity index '2' and subframe index '6' in the frame following the frame in which the AAI_RNG-ACK message is received since the frame offset is assumed to be 1 (S340).

When the target base station signals, to the mobile station, that the corresponding ranging code has been successfully received through the AAI_RNG-ACK message (S350), the mobile station can perform the following ranging procedure.

FIG. 4 illustrates another exemplary ranging procedure according to the present embodiment of the invention.

In FIG. 4, a ranging code and a ranging channel transmitted by the mobile station are used for retransmission and it is assumed that the frame offset is 1.

Referring to FIG. 4, the serving base station transmits dedicated code '77' and ranging channel information (subframe index '5') to the mobile station through an AAI_HO-CMD message (S410).

The mobile station transmits the dedicated code to the target base station (S420).

When the reception status of the dedicated code is "continue", the target base station sets a ranging status of the received dedicated code '77' to "continue" in an AAI_RNG-ACK message, includes a dedicated flag set to '1' and a physical correction value in the AAI_RNG-ACK message, and transmits the AAI_RNG-ACK message to the mobile station (S430).

The mobile station corrects physical parameters and transmits, to the target base station, the initially transmitted dedicated ranging code '77' through the ranging channel corresponding to the same subframe index as that of the initially transmitted ranging channel in the frame following the frame in which the AAI_RNG-ACK message is received because the dedicated flag is set to '1' and the frame offset is assumed to be 1 (S440).

When the target base station signals, to the mobile station, that the corresponding ranging code has been successfully received through the AAI_RNG-ACK message (S450), the mobile station can perform the following ranging procedure.

FIG. 5 illustrates another exemplary ranging procedure according to the present embodiment of the invention.

In FIG. 5, the initially transmitted dedicated ranging code is used for ranging code retransmission and only the ranging channel is changed. It is assumed that the frame offset is 1.

Referring to FIG. 5, the serving base station transmits dedicated code '77' to the mobile station through the AAI_HO-CMD message (S510).

The mobile station transmits the dedicated code to the target base station (S520).

When the reception status of the dedicated code is "continue", the target base station sets a ranging status of the received dedicated code '77' to "continue" in the AAI_RNG-ACK message, includes the dedicated flag set to '1', dedicated ranging channel (subframe index '6', opportunity index '2') information and a physical correction value in the AAI_RNG-ACK message, and transmits the AAI_RNG-ACK message to the mobile station (S530).

The mobile station corrects physical parameters and transmits, to the target base station, dedicated ranging code '77' with opportunity index '2' and subframe index '6' in the frame following the frame in which the AAI_RNG-ACK message is received since the frame offset is 1 (S540).

When the target base station signals, to the mobile station, that the corresponding ranging code has been successfully received through the AAI_RNG-ACK message (S550), the mobile station can perform the following ranging procedure.

FIG. 6 illustrates another exemplary ranging procedure according to the present embodiment of the invention.

Steps S610 to S650 are similar to steps S510 to S550 of FIG. 5. When the dedicated flag included in the AAI_RNG-ACK message transmitted to the mobile station in S630 is set to '1', this indicates extension of a ranging initiation deadline. Explanations of redundant procedures are omitted for brevity.

While the above-described aspects of the first embodiment have focused on a case in which the base station dynamically allocates a ranging opportunity, the present invention is not limited thereto and can be applied to a method for signaling a ranging opportunity through an S-SFH instead of dynamic allocation. Furthermore, a ranging region (subframe index, opportunity index) may be allocated through the AAI_HO-CMD message, which is not shown in the figures.

Second Embodiment

In accordance with a second embodiment of the present invention, when a mobile station that has transmitted a dedicated ranging code allocated thereto to a base station does not receive an AAI_RNG-ACK message as a response to the dedicated ranging code (that is, detection failure—implicit NACK or explicit NACK) or a ranging status is "continue" in the AAI_RNG-ACK message, ranging code retransmission is performed without carrying out a backoff algorithm.

That is, in the case of detection failure of the base station or ranging status of "continue", the mobile station can retransmit a ranging code in the first ranging opportunity of a ranging channel allocated for each ranging type (i.e. an initial ranging channel when the ranging type of the mobile station is initial ranging, a handover ranging channel when the ranging type is handover ranging, and a periodic ranging channel when the ranging type is periodic ranging).

This will now be described with reference to FIG. 7.

Figure 7:
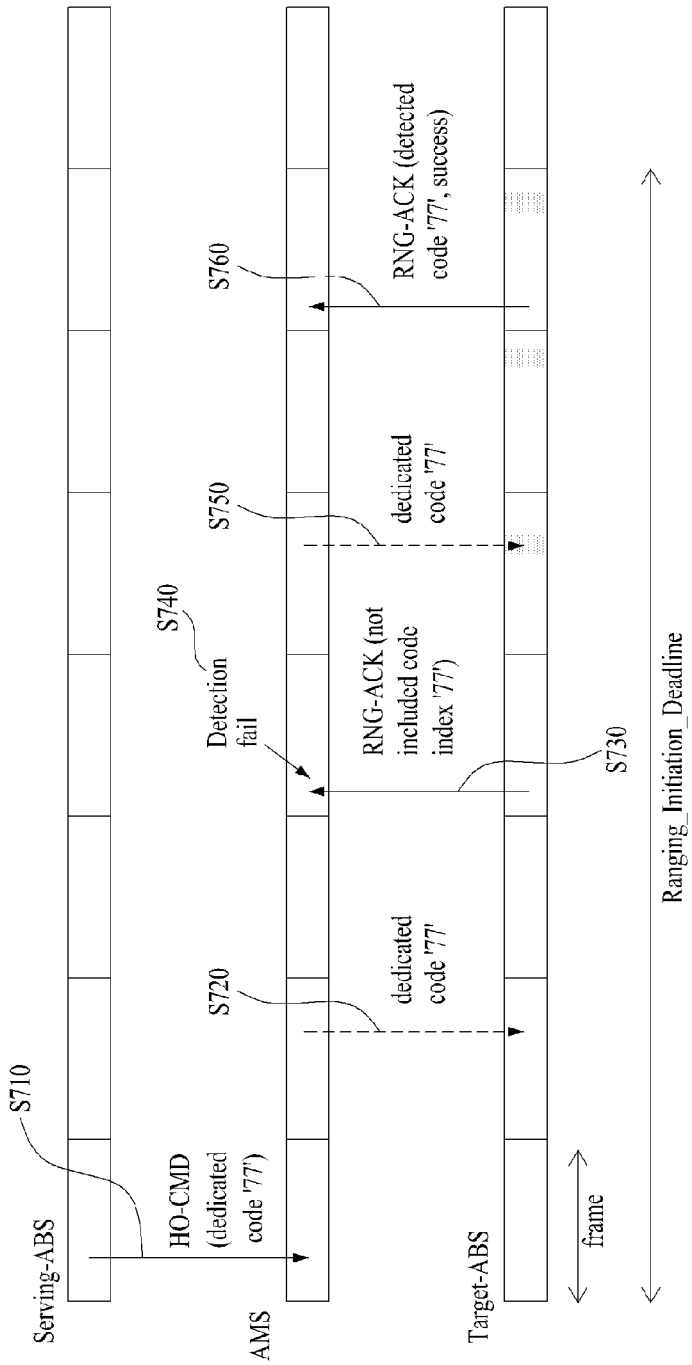
FIG. 7 illustrates an exemplary ranging procedure according to a second embodiment of the present invention.

FIG. 7 illustrates an exemplary ranging procedure according to the second embodiment of the present invention.

Referring to FIG. 7, the serving station transmits dedicated ranging code '77' to the mobile station through an AAI_HO-CMD message (S710).

The mobile station transmits the dedicated ranging code to the target base station (S720).

When the target base station does not detect the dedicated ranging code, the corresponding code information is not included in an AAI_RNG-ACK message (S730).

Upon reception of the AAI_RNG-ACK message that does not include the dedicated ranging code transmitted by the mobile station, the mobile station determines that the target base station does not receive the dedicated ranging code (S740) and retransmits the dedicated ranging code '77' in a first handover ranging channel of the next frame (S750).

When the target base station signals, to the mobile station, that the corresponding dedicated ranging code has been successfully received through the AAI_RNG-ACK message (S760), the mobile station can perform the following ranging procedure.

A description will be given of a procedure after the target base station successfully receives the dedicated ranging code.

The target base station that has received the dedicated ranging code knows the mobile station that has transmitted the dedicated ranging code. The AAI_HO-CMD message may include a station identifier (STID) previously allocated by the base station to the mobile station as well as the dedicated ranging code. In this case, since the mobile station has obtained the STID, it is not necessary to transmit the AAI_RNG-ACK message based on a broadcast or random access identifier (RAID).

Accordingly, it is possible to signal whether the corresponding dedicated ranging code has been received through the AAI_RNG-ACK message in a unicast manner. In this case, the AAI_RNG-ACK message may include only parameters (e.g. unicast indication, ranging status, API, physical parameter correction value, etc.) that are transmitted in a unicast case.

Furthermore, when a plurality of ranging codes (including a dedicated ranging code) is received in a corresponding frame, the base station can signal whether the ranging codes have been received through the AAI_RNG-ACK message in a broadcast manner.

The base station can determine which one of the unicast and broadcast schemes is used for transmission based on transmission overhead in consideration of the number of ranging codes received by the base station in the corresponding frame, whether the ranging codes are dedicated ranging codes, grant in an AAI_RNG-ACK transmission timer, etc. It is possible to consider a transmission overhead corresponding to one A-MAP and one message in the broadcast case and to consider a transmission overhead corresponding to as many A-MAPs as the number of messages and a plurality of messages in the unicast case.

After the base station transmits, to the mobile station, the AAI_RNG-ACK message indicating that the corresponding ranging code has been successfully received, the base station allocates an uplink resource such that the mobile station can transmit an AAI_RNG-REQ message through the uplink resource. In this case, the base station can allocate the uplink resource through an STID based basic assignment A-MAP IE instead of an RAID based CDMA allocation A-MAP IE.

Ranging procedures according to the second embodiment of the present invention will now be described with reference to FIGS. 8 to 10.

Figure 8:
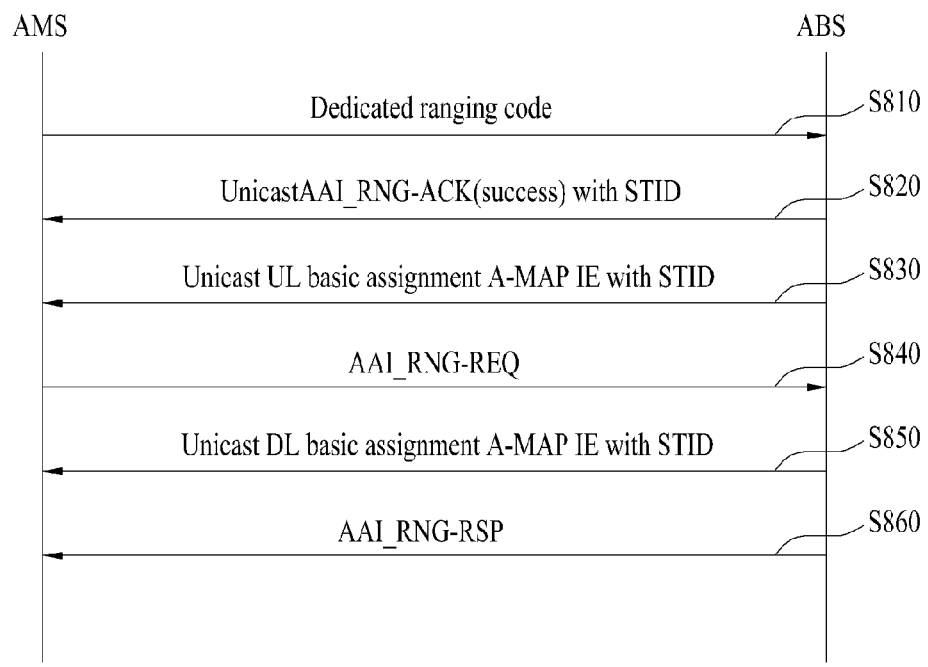
FIG. 8 illustrates an exemplary ranging procedure including medium access control message exchange according to the second embodiment of the present invention.

FIG. 8 illustrates an exemplary ranging procedure including medium access control message exchange according to the second embodiment of the present invention.

In FIG. 8, it is assumed that an STID is allocated to a mobile station in advance through an AAI_HO-CMD message.

Referring to FIG. 8, the mobile station transmits a dedicated ranging code to a base station (S810).

The base station successfully receives the dedicated ranging code and transmits an STID based AAI_RNG-ACK message in a unicast manner to the mobile station (S820).

In addition, the base station allocates an uplink resource through which the mobile station will transmit an AAI_RNG-REQ message through an STID based unicast uplink (UL) basic assignment A-MAP IE (S830).

The mobile station transmits the AAI_RNG-REQ message to the base station through the uplink resource allocated thereto (S840), and the base station transmits, to the mobile station, information on a resource region in which an AAI_RNG-RSP message will be transmitted through an STID based unicast downlink (DL) basic assignment A-MAP IE (S850).

Then, the mobile station can receive the AAI_RNG-RSP message through a downlink resource corresponding to the resource region (S860).

Figure 9:
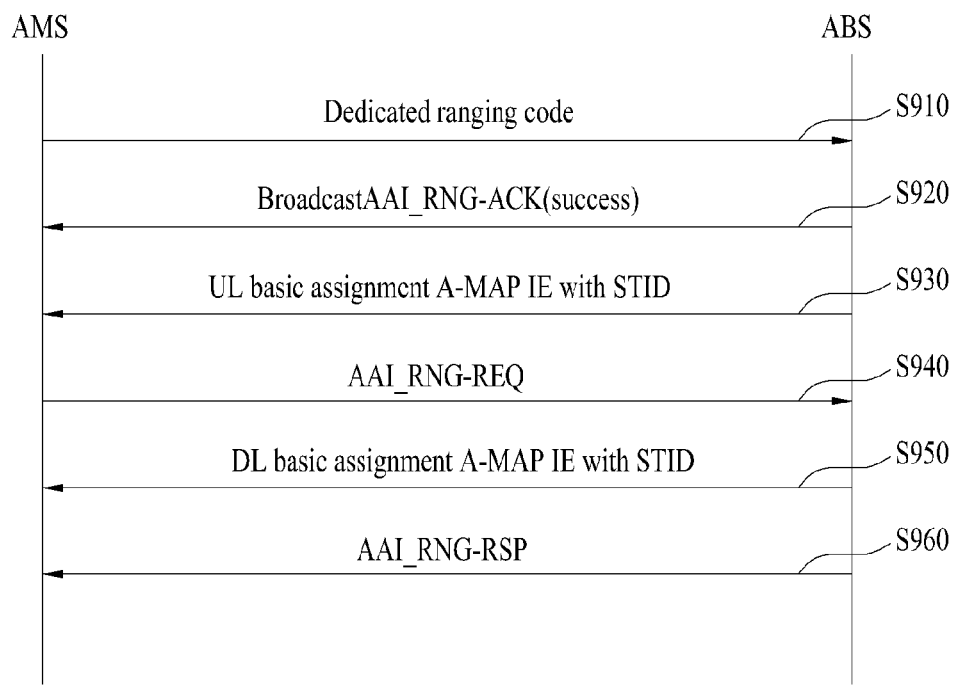
FIG. 9 illustrates another exemplary ranging procedure including medium access control message exchange according to the second embodiment of the present invention.

FIG. 9 illustrates another exemplary ranging procedure including medium access control message exchange according to the present embodiment of the invention.

In FIG. 9, it is assumed that an STID is allocated to the mobile station in advance through an AAI_HO-CMD message.

Referring to FIG. 9, the mobile station transmits a dedicated ranging code to a base station (S910).

The base station successfully receives the dedicated ranging code and transmits an AAI_RNG-ACK message in a broadcast manner to the mobile station (S920).

In addition, the base station allocates an uplink resource through which the mobile station will transmit an AAI_RNG-REQ message through an STID based unicast UP basic assignment A-MAP IE (S930).

The mobile station transmits the AAI_RNG-REQ message to the base station through the uplink resource allocated thereto (S940), and the base station transmits, to the mobile station, information on a resource region in which an AAI_RNG-RSP message will be transmitted through an STID based unicast DL basic assignment A-MAP IE (S950).

Then, the mobile station can receive the AAI_RNG-RSP message through a downlink resource corresponding to the resource region (S960).

Figure 10:
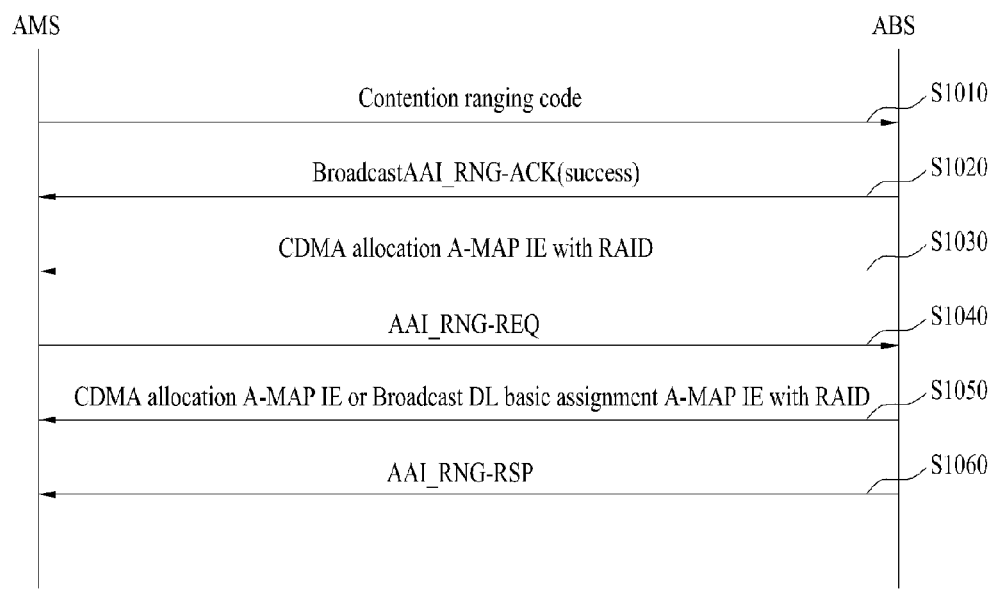
FIG. 10 illustrates another exemplary ranging procedure including medium access control message exchange according to the second embodiment of the present invention.

FIG. 10 illustrates another exemplary ranging procedure including medium access control message exchange according to the present embodiment of the invention.

Referring to FIG. 10, the mobile station transmits a contention-based ranging code to the base station (S1010).

The base station successfully receives the contention-based ranging code and transmits an AAI_RNG-ACK message in a broadcast manner to the mobile station (S1020).

In addition, the base station allocates an uplink resource through which the mobile station will transmit an AAI_RNG-REQ message through an RAID based CDMA allocation A-MAP IE (S1030).

The mobile station transmits the AAI_RNG-REQ message to the base station through the uplink resource allocated thereto (S1040), and the base station transmits information on a resource region in which an AAI_RNG-RSP message will be transmitted to the mobile station (S1050).

Here, the information on the resource region may be transmitted to the mobile station through a RAID based CDMA allocation A-MAP IE or a broadcast DL basic assignment A-MAP IE.

Then, the mobile station can receive the AAI_RNG-RSP message through a downlink resource corresponding to the resource region (S1060).

Configurations of a Mobile Station and a Base Station

A description will be given of a mobile station and a base station applicable to the above-described embodiments of the present invention according to an embodiment of the present invention.

The mobile station may operate as a transmitter in uplink and operate as a receiver in downlink. The base station may operate as a receiver in uplink and operate as a transmitter in downlink. That is, the mobile station and the base station may include a transmitter and a receiver for transmission of information or data.

The transmitter and the receiver may include a processor, a module, a part and/or means for performing the embodiments of the present invention. Particularly, the transmitter and the receiver may include a module (means) for coding messages, a module for decoding the coded messages, an antenna for transmitting/receiving messages, etc. Examples of the transmitter and the receiver will now be described with reference to FIG. 11.

Figure 11:
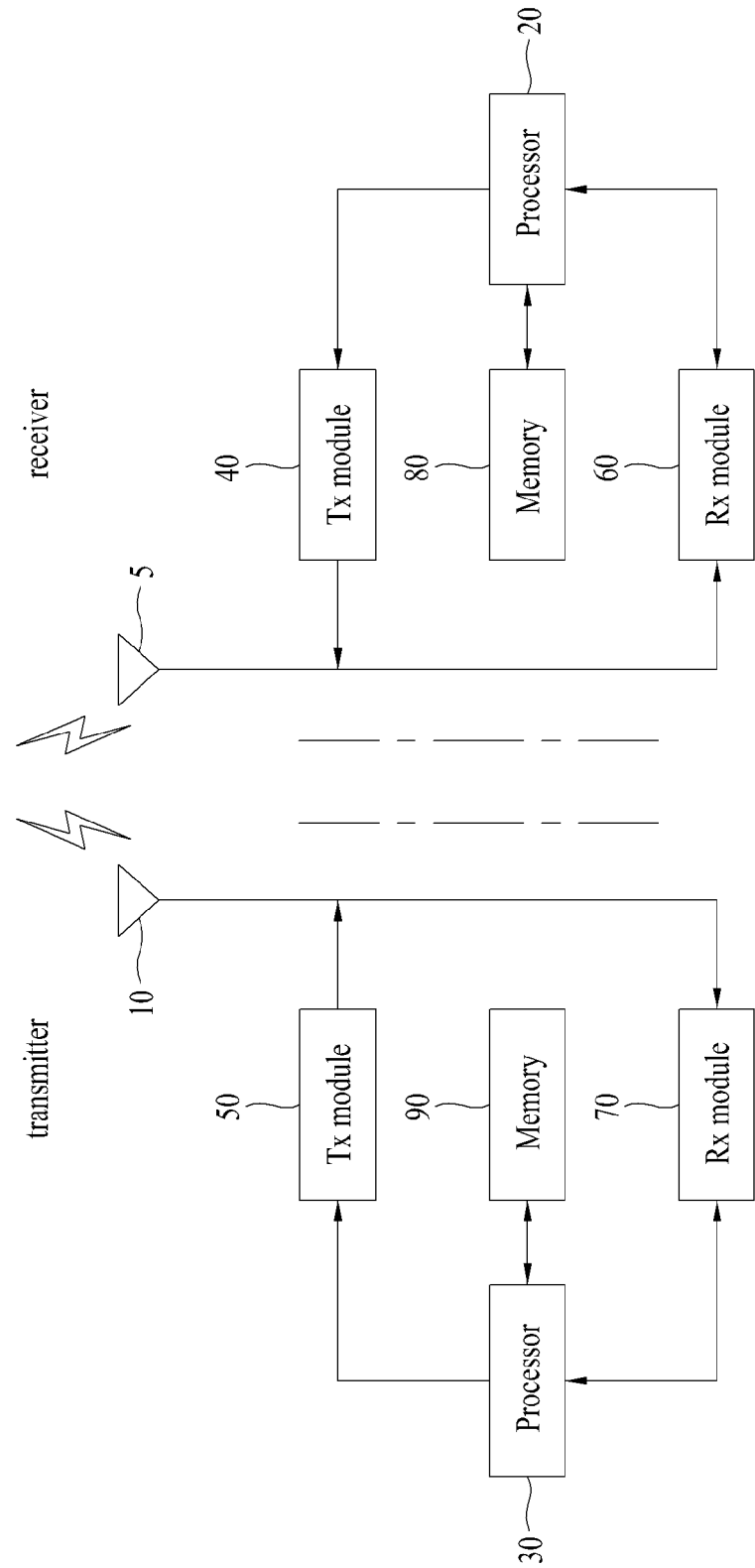
FIG. 11 is a block diagram illustrating configurations of a transmitter and a receiver according to an embodiment of the present invention.

FIG. 11 is a block diagram illustrating configurations of the transmitter and the receiver according to an embodiment of the present invention.

Referring to FIG. 11, the left part shows the configuration of the transmitter and the right part shows the configuration of the receiver. The receiver and the transmitter may respectively include antennas 5 and 10, processors 20 and 30, transmission (Tx) modules 40 and 50, reception (Rx) modules 60 and 70, and memories 80 and 90. Components corresponding to each other may execute functions corresponding to each other. Each component will now be described in detail.

The antennas 5 and 10 transmit signals generated by the Tx modules 40 and 50 to the outside, or receive external radio frequency (RF) signals and transmit the received RF signals to the Rx modules 60 and 70. Each of the transmitter and the receiver may include two or more antennas when MIMO is supported.

The antenna, Tx module and Rx module can constitute an RF module.

The processors 20 and 30 control the overall operation of the mobile station. For example, the processors 20 and 30 can execute a controller function, a medium access control (MAC) frame variable control function according to service characteristics and propagation environment, a handover function, authentication and encoding functions, etc, to perform the above-described embodiments of the present invention. More specifically, the processors 20 and 30 can perform control for performing the aforementioned system information transmission/update procedure.

Particularly, the processor of the mobile station selects a ranging code and transmits the selected ranging code to the base station in a ranging opportunity suitable for a ranging purpose. In addition, the processor of the mobile station may wait for an AAI_RNG-ACK message transmitted from the base station until a predetermined time according to the ranging purpose, check a reception status of the transmitted ranging code using the AAI_RNG-ACK message upon receiving the AAI_RNG-ACK message, and determine the following operation. Here, when the ranging status is "continue" in the AAI_RNG-ACK message, the processor can perform different subsequent operations as illustrated in FIGS. 1 to 10 according to parameters (e.g. a new dedicated ranging code, a new ranging channel, a code valid duration, a dedicated flag, etc.) included in the AAI_RNG-ACK message.

In addition, the processor of the mobile station can control the procedures illustrated in the above-mentioned embodiments of the present invention.

The Tx modules 40 and 50 may perform predetermined coding and modulation on data that is scheduled by the processors 20 and 30 to be transmitted to the outside, and then transmit the data to the antennas 5 and 10.

The Rx modules 60 and 70 may perform decoding and modulation of RF signals received through the antennas 5 and 10 to restore original data and transmit the original data to the processors 20 and 30.

The memories 80 and 90 may store programs for processing and control of the processors 20 and 30 and may temporarily store input/output data. The memories 80 and 90 may include at least one of a flash memory, a hard disk, a multimedia card micro type memory, a card type memory (e.g. SD or XD memory), a random access memory (RAM), a static RAM (SRAM), a read-only memory (ROM), an electrically erasable programmable ROM (EEPROM), a programmable ROM (PROM), a magnetic memory, a magnetic disc, and an optical disc.

A base station and a relay may execute a controller function, an orthogonal frequency division multiple access (OFDMA) packet scheduling and channel multiplexing function, a MAC frame variable control function according service characteristics and propagation environment, a high-speed traffic real-time control function, a handover function, an authentication and encryption function, a packet modulation/demodulation function for data transmission, a high-speed packet channel coding function, a real-time modem control function, etc. for performing the aforementioned embodiments of the present invention through at least one of the above-described modules or may include a separate means, module or part for executing these functions.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

INDUSTRIAL APPLICABILITY

While the above description of the above-mentioned efficient ranging procedures and a mobile station configuration for the same in a broadband wireless access system focuses on cases in which the ranging procedures and mobile station configuration are applied to the IEEE 802.16m system, the present invention is applicable to various mobile communication systems such as 3GPP/3GPP2 in addition to IEEE 802.xx.

The invention claimed is:
1. A method of performing ranging with a mobile station (MS) in a broadband wireless access system, the method comprising:
  transmitting a first ranging code for requesting ranging to a base station through a first ranging opportunity of a first frame; and
  receiving a first message including a response to the first ranging code,
  wherein when the first ranging code is a dedicated ranging code and the response to the first ranging code is "continue", the first message further includes a dedicated flag field,
  wherein when the dedicated flag field is set to '1', the first message further includes a second ranging code, and information on a second ranging opportunity, and
  wherein the second ranging code is a dedicated ranging code which is different from the first ranging code.

2. The method according to claim 1, further comprising:
transmitting the second ranging code in a ranging opportunity indicated by the second ranging opportunity of a frame after frames corresponding to a predetermined frame offset from a time when the first message is received, when the dedicated flag field included in the first message is set to '1'.

3. The method according to claim 1, wherein the first message is a ranging acknowledgement (AAI_RNG-ACK) message and the response to the first ranging code is a ranging status field.

4. A method of performing ranging with a base station in a broadband wireless access system, the method comprising:
receiving a first ranging code for requesting ranging from a mobile station through a first ranging opportunity of a first frame;
when the first ranging code is a dedicated ranging code previously allocated to the mobile station along with an identifier for the mobile station, transmitting a first message including a response "continue" to the first ranging code to the mobile station in a unicast manner based on the identifier; and
transmitting, to the mobile station, uplink resource allocation information about an uplink resource through which the mobile station will transmit a second message through a first advanced MAP (A-MAP) information element (IE), upon successful reception of the first ranging code,
wherein the first message includes a dedicated flag field,
wherein when the dedicated flag field is set to '1', the first message further includes a second ranging code, and information on a second ranging opportunity, and
wherein the second ranging code is a dedicated ranging code which is different from the first ranging code.

5. The method according to claim 4, further comprising:
receiving the second message from the mobile station;
transmitting, to the mobile station, downlink resource information for transmitting a third message to the mobile station as a response to the second message through a second A-MAP IE; and
transmitting the third message to the mobile station through a downlink resource indicated by the downlink resource information.

6. The method according to claim 4, wherein the first message is a ranging acknowledgement (AAI_RNG-ACK) message, the identifier for the mobile station is a station identifier (STID), the second message is a ranging request (AAI_RNG-REQ) message, and the first A-MAP IE is an uplink basic assignment A-MAP IE.

7. The method according to claim 6, wherein the third message is a ranging response (AAI RNG-RSP) message and the second A-MAP IE is a unicast downlink basic assignment A-MAP IE using the STID.

8. The method according to claim 6, wherein the third message is a ranging response (AAI_RNG-RSP) message and the second A-MAP is a random access identifier (RAID) based code division multiple access (CDMA) allocation A-MAP IE.

9. A mobile station performing ranging in a broadband wireless access system, the mobile station comprising:
a radio frequency (RF) module configured to transmit and receive RF signals; and
a processor configured to control the RF module,
wherein the processor is further configured to transmit, via the RF module, a first ranging code for requesting ranging to a base station through a first ranging opportunity of a first frame and to receive, via the RF module, a first message including a response to the first ranging code,
wherein when the first ranging code is a dedicated ranging code and the response to the first ranging code is "continue", the first message further includes a dedicated flag field,
wherein when the dedicated flag field is set to '1', the first message further includes a second ranging code, and information on a second ranging opportunity, and
wherein the second ranging code is a dedicated ranging code which is different from the first ranging code.

10. The mobile station according to claim 9, wherein the processor is further configured to transmit, via the RF module, the second ranging code in a ranging opportunity indicated by the second ranging opportunity of a frame after frames corresponding to a predetermined frame offset from a time when the first message is received, when the dedicated flag field is set to '1'.

11. The mobile station according to claim 9, wherein the first message is a ranging acknowledgement (AAI_RNG-ACK) message and the response to the first ranging code is a ranging status field.

* * * * *